US 12,464,596 B2

United States Patent
Akl et al.

(10) Patent No.: US 12,464,596 B2
(45) Date of Patent: Nov. 4, 2025

(54) TECHNIQUES FOR TRANSITIONING RADIO RESOURCE CONTROL STATE OF A REPEATER

(71) Applicant: QUALCOMM Incorporated, San Diego, CA (US)

(72) Inventors: Naeem Akl, Bridgewater, NJ (US); Navid Abedini, Basking Ridge, NJ (US); Karl Georg Hampel, Jersey City, NJ (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 18/296,176

(22) Filed: Apr. 5, 2023

(65) Prior Publication Data

US 2024/0340994 A1    Oct. 10, 2024

(51) Int. Cl.
*H04W 76/27* (2018.01)
*H04W 68/02* (2009.01)
*H04W 76/11* (2018.01)

(52) U.S. Cl.
CPC .......... *H04W 76/27* (2018.02); *H04W 68/02* (2013.01); *H04W 76/11* (2018.02)

(58) Field of Classification Search
CPC ..... H04W 76/27; H04W 76/11; H04W 76/30; H04W 68/02
See application file for complete search history.

(56) References Cited

U.S. PATENT DOCUMENTS

| | | | |
|---|---|---|---|
| 2023/0075703 A1* | 3/2023 | Zhu ........................ | H04W 76/27 |
| 2023/0164773 A1* | 5/2023 | Alfarhan ........... | H04W 74/0833 |
| | | | 370/329 |
| 2025/0184983 A1* | 6/2025 | Fujishiro ........... | H04W 72/0457 |

* cited by examiner

*Primary Examiner* — Farid Seyedvosoghi
(74) *Attorney, Agent, or Firm* — Holland & Hart LLP

(57) ABSTRACT

Methods, systems, and devices for wireless communications are described. Techniques described herein support transitioning the radio resource control (RRC) state of a network controlled repeater (NCR). A distributed unit (DU) and a central unit (CU) may coordinate the release and resumption of the RRC connection of the NCR. The CU may transmit a control signal to the DU indicating to release the RRC connection of the NCR. The control signal may include a flag, such as an identifier of the NCR, and the DU may retain the identifier of the NCR. The DU may transmit a message indicating a release of the RRC connection to the NCR. The DU may coordinate the resumption of the RRC connection of the NCR by transmitting a second message to the CU. The second message may include a request to initiate a paging of the NCR and may include the identifier of the NCR.

30 Claims, 11 Drawing Sheets

TECHNIQUES FOR TRANSITIONING RADIO RESOURCE CONTROL STATE OF A REPEATER

FIELD OF TECHNOLOGY

The following relates to wireless communications, including techniques for transitioning radio resource control state of a repeater.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for transitioning a radio resource control (RRC) state of a repeater. For example, the described techniques provide for a distributed unit and a central unit to coordinate the release and resumption of the RRC connection of a network-controlled repeater (NCR). The NCR may include an NCR Forwarding (NCR-Fwd) functional entity and an NCR mobile termination (NCR-MT) functional entity. To coordinate release of the RRC connection of the NCR-MT, the DU may request the CU to release the RRC connection of the NCR-MT. The CU may transmit a control signal to the DU indicating to release the RRC connection of the NCR-MT. The control signal to the DU may include a flag, such as an identifier of the NCR-MT, and the DU may retain the identifier of the NCR-MT. The DU may transmit a message indicating a release of the RRC connection to the NCR-MT. The DU may coordinate the resumption of the RRC connection of the NCR-MT. The DU may transmit a second message to the CU, and the second message may include a request to initiate a paging of the NCR-MT and may include the identifier of the NCR-MT.

A method for wireless communications at a distributed unit is described. The method may include receiving, from a CU, a first control signal indicating to release a RRC connection of a NCR-MT, where the first control signal including an identifier of the NCR-MT, transmitting, to the NCR-MT, a first message indicating a release of the RRC connection, detecting a trigger of new side control information for the NCR-MT, and transmitting a second message, in response to the trigger, indicating to resume the RRC connection of the NCR-MT, where the second message including the identifier of the NCR-MT.

An apparatus for wireless communications at a distributed unit is described. The apparatus may include a processor, memory coupled with the processor, and instructions stored in the memory. The instructions may be executable by the processor to cause the apparatus to receive, from a CU, a first control signal indicating to release an RRC connection of a NCR-MT, where the first control signal including an identifier of the NCR-MT, transmit, to the NCR-MT, a first message indicating a release of the RRC connection, detect a trigger of new side control information for the NCR-MT, and transmit a second message, in response to the trigger, indicating to resume the RRC connection of the NCR-MT, where the second message including the identifier of the NCR-MT.

Another apparatus for wireless communications at a distributed unit is described. The apparatus may include means for receiving, from a CU, a first control signal indicating to release an RRC connection of a NCR-MT, where the first control signal including an identifier of the NCR-MT, means for transmitting, to the NCR-MT, a first message indicating a release of the RRC connection, means for detecting a trigger of new side control information for the NCR-MT, and means for transmitting a second message, in response to the trigger, indicating to resume the RRC connection of the NCR-MT, where the second message including the identifier of the NCR-MT.

A non-transitory computer-readable medium storing code for wireless communications at a distributed unit is described. The code may include instructions executable by a processor to receive, from a CU, a first control signal indicating to release an RRC connection of a NCR-MT, where the first control signal including an identifier of the NCR-MT, transmit, to the NCR-MT, a first message indicating a release of the RRC connection, detect a trigger of new side control information for the NCR-MT, and transmit a second message, in response to the trigger, indicating to resume the RRC connection of the NCR-MT, where the second message including the identifier of the NCR-MT.

In some examples of the method, apparatuses, and non-transitory computer-readable medium described herein, the identifier of the NCR-MT including one or more F1AP UE identifiers associated with the NCR-MT.

In some examples of the method, apparatuses, and non-transitory computer-readable medium described herein, transmitting the second message may include operations, features, means, or instructions for transmitting the second message to the CU, where the second message including a request to initiate a paging of the NCR-MT.

In some examples of the method, apparatuses, and non-transitory computer-readable medium described herein, the identifier including one or more F1AP UE identifiers associated with the NCR-MT.

In some examples of the method, apparatuses, and non-transitory computer-readable medium described herein, transmitting the second message may include operations, features, means, or instructions for transmitting the second message to the CU, where the second message including a side control configuration for a NCR associated with the NCR-MT.

In some examples of the method, apparatuses, and non-transitory computer-readable medium described herein, transmitting the second message may include operations, features, means, or instructions for transmitting the second message to the NCR-MT, where the second message including a paging message.

In some examples of the method, apparatuses, and non-transitory computer-readable medium described herein, the identifier including a paging identity.

In some examples of the method, apparatuses, and non-transitory computer-readable medium described herein, the NCR-MT transitions to an RRC inactive state or an RRC idle state after release of the RRC connection.

Some examples of the method, apparatuses, and non-transitory computer-readable medium described herein may further include operations, features, means, or instructions for transmitting, to the CU, a second control signal indicating a request to release the RRC connection of the NCR-MT, where the receiving the first control signal may be in response to the second control signaling.

In some examples of the method, apparatuses, and non-transitory computer-readable medium described herein, the second control signal including an indication of an RRC state of the NCR-MT after release of the RRC connection.

In some examples of the method, apparatuses, and non-transitory computer-readable medium described herein, the second control signal including an indication of a NCR remaining operational after release of the RRC connection, the NCR may be associated with the NCR-MT.

In some examples of the method, apparatuses, and non-transitory computer-readable medium described herein, the second control signal including a side control configuration for the operation of the NCR after release of the RRC connection.

In some examples of the method, apparatuses, and non-transitory computer-readable medium described herein, the first control signal including an indication of an RRC state of the NCR-MT after release of the RRC connection.

In some examples of the method, apparatuses, and non-transitory computer-readable medium described herein, the first control signal including an indication of a NCR remaining operational after release of the RRC connection and the NCR may be associated with the NCR-MT.

In some examples of the method, apparatuses, and non-transitory computer-readable medium described herein, the indication of the NCR remaining operational includes a side control configuration for operation of the NCR after release of the RRC connection.

In some examples of the method, apparatuses, and non-transitory computer-readable medium described herein, the first control signal including an indication to retain a UE context for the NCR-MT.

In some examples of the method, apparatuses, and non-transitory computer-readable medium described herein, the UE context including the identifier of the NCR-MT.

In some examples of the method, apparatuses, and non-transitory computer-readable medium described herein, the first control signal including a UE context release command message.

In some examples of the method, apparatuses, and non-transitory computer-readable medium described herein, the first control signal including a UE context setup message or a UE context modification message or a new message and first control signal including an RRC container to release the RRC connection of the NCR-MT.

In some examples of the method, apparatuses, and non-transitory computer-readable medium described herein, the identifier of the NCR-MT including a radio access network (RAN) UE paging identity of the NCR-MT.

In some examples of the method, apparatuses, and non-transitory computer-readable medium described herein, the identifier of the NCR-MT including a core network (CN) UE paging identity associated with the NCR-MT.

A method for wireless communications at a CU is described. The method may include transmitting, to a DU, a first control signal indicating to release an RRC connection of a NCR-MT, where the first control signal including an identifier of the NCR-MT and receiving, from the DU, a second message indicating to resume the RRC connection of the NCR-MT.

An apparatus for wireless communications at a central unit is described. The apparatus may include a processor, memory coupled with the processor, and instructions stored in the memory. The instructions may be executable by the processor to cause the apparatus to transmit, to a DU, a first control signal indicating to release an RRC connection of a NCR-MT, where the first control signal including an identifier of the NCR-MT and receive, from the DU, a second message indicating to resume the RRC connection of the NCR-MT.

Another apparatus for wireless communications at a central unit is described. The apparatus may include means for transmitting, to a DU, a first control signal indicating to release an RRC connection of a NCR-MT, where the first control signal including an identifier of the NCR-MT and means for receiving, from the DU, a second message indicating to resume the RRC connection of the NCR-MT.

A non-transitory computer-readable medium storing code for wireless communications at a central unit is described. The code may include instructions executable by a processor to transmit, to a DU, a first control signal indicating to release an RRC connection of a NCR-MT, where the first control signal including an identifier of the NCR-MT and receive, from the DU, a second message indicating to resume the RRC connection of the NCR-MT.

In some examples of the method, apparatuses, and non-transitory computer-readable medium described herein, the identifier of the NCR-MT including one or more F1AP UE identifiers associated with the NCR-MT.

In some examples of the method, apparatuses, and non-transitory computer-readable medium described herein, the second message including a request to initiate a paging of the NCR-MT.

In some examples of the method, apparatuses, and non-transitory computer-readable medium described herein, the identifier including one or more F1AP UE identifiers associated with the NCR-MT.

In some examples of the method, apparatuses, and non-transitory computer-readable medium described herein, the second message including a side control configuration for a NCR associated with the NCR-MT.

In some examples of the method, apparatuses, and non-transitory computer-readable medium described herein, the identifier including a paging identity.

In some examples of the method, apparatuses, and non-transitory computer-readable medium described herein, the NCR-MT transitions to an RRC inactive state or an RRC idle state after release of the RRC connection.

Some examples of the method, apparatuses, and non-transitory computer-readable medium described herein may further include operations, features, means, or instructions for receiving, from the DU, a second control signal indicating a request to release the RRC connection of the NCR-MT, where the transmitting the first control signal may be in response to the second control signal.

In some examples of the method, apparatuses, and non-transitory computer-readable medium described herein, the second control signal including an indication of an RRC state of the NCR-MT after release of the RRC connection.

In some examples of the method, apparatuses, and non-transitory computer-readable medium described herein, the second control signal including an indication of a NCR remaining operational after release of the RRC connection, the NCR may be associated with the NCR-MT.

In some examples of the method, apparatuses, and non-transitory computer-readable medium described herein, the second control signal including a side control configuration for the operation of the NCR after release of the RRC connection.

In some examples of the method, apparatuses, and non-transitory computer-readable medium described herein, the first control signal including an indication of an RRC state of the NCR-MT after release of the RRC connection.

In some examples of the method, apparatuses, and non-transitory computer-readable medium described herein, the first control signal including an indication of a NCR remaining operational after release of the RRC connection and the NCR may be associated with the NCR-MT.

In some examples of the method, apparatuses, and non-transitory computer-readable medium described herein, the indication of the NCR remaining operational includes a side control configuration for operation of the NCR after release of the RRC connection.

In some examples of the method, apparatuses, and non-transitory computer-readable medium described herein, the first control signal including an indication to retain a UE context for the NCR-MT.

In some examples of the method, apparatuses, and non-transitory computer-readable medium described herein, the UE context including the identifier of the NCR-MT.

In some examples of the method, apparatuses, and non-transitory computer-readable medium described herein, the first control signal including a UE context release command message.

In some examples of the method, apparatuses, and non-transitory computer-readable medium described herein, the first control signal including a UE context setup message or a UE context modification message or a new message and first control signal including an RRC container to release the RRC connection of the NCR-MT.

In some examples of the method, apparatuses, and non-transitory computer-readable medium described herein, the identifier of the NCR-MT including a RAN UE paging identity of the NCR-MT.

In some examples of the method, apparatuses, and non-transitory computer-readable medium described herein, the identifier of the NCR-MT including a CN UE paging identity associated with the NCR-MT.

DETAILED DESCRIPTION

Figure 1:
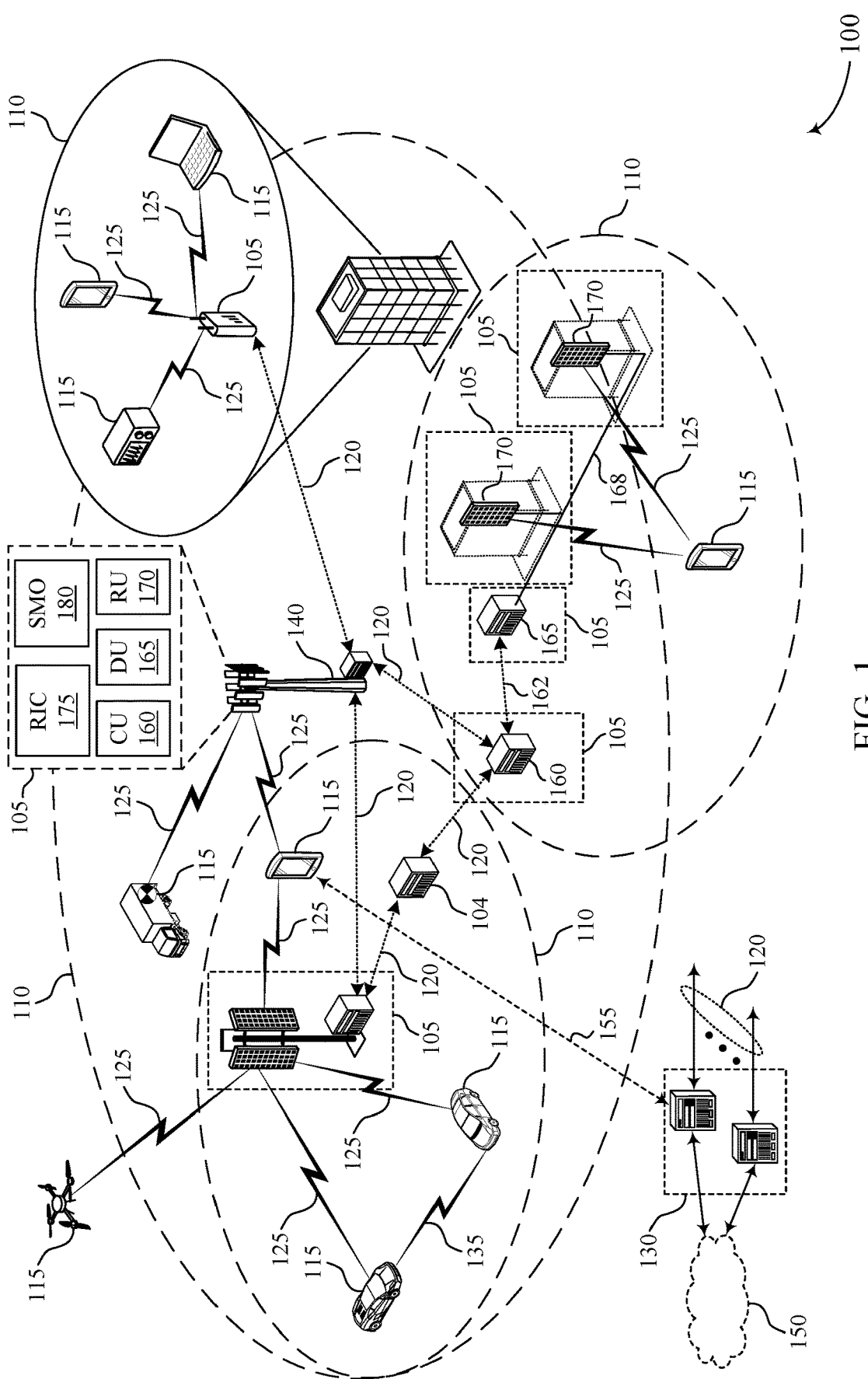
FIG. 1 shows an example of a wireless communications system that supports techniques for transitioning radio resource control state of a repeater in accordance with one or more aspects of the present disclosure.

Some wireless communications systems may include a network-controlled repeater (NCR). The NCR may include an NCR Forwarding (NCR-Fwd) functional entity and an NCR mobile termination (NCR-MT) functional entity. The NCR-Fwd may perform amplify-and-forward of uplink and downlink radio frequency signals between a network entity and a user equipment (UE) with beamforming capabilities and time-division duplexing (TDD) operations. The NCR-MT may communicate, with the network entity via a control link, side control information, such as control and status signaling, based on a Uu interface. The behavior of the NCR-Fwd may be controlled according to the side control information received by the NCR-MT from the network entity, and the NCR-MT supports UE functionality, including RRC states of inactive, idle and connected.

When there is no side control information to exchange, the network entity may release the RRC connection of the NCR-MT to the RRC inactive state. When the NCR-MT enters the RRC inactive state, the NCR-Fwd may operate following the last side control configuration received from the network entity. In some examples, the network entity may be implemented in a disaggregated architecture including a central unit (CU) and a distributed unit (DU). The DU may transmit the side control information to the NCR-MT, and the DU may receive side control information from the NCR-MT. The DU may control the NCR operations; however, the CU may control the RRC connection of the NCR-MT. That is, the CU may decide whether to release the RRC connection of the NCR-MT even though the DU may determine that no control information is to be transmitted or received. Additionally, following the release of the RRC connection of the NCR-MT, the CU may decide whether to resume the RRC connection of the NCR-MT even though the DU may have updated side control configuration for the NCR.

In some examples, the DU and CU may coordinate the release of the RRC connection of the NCR-MT. The CU may transmit a control signal to the DU indicating to release the RRC connection of the NCR-MT. The control signal to the DU may include a flag, such as an identifier of the NCR-MT, and the DU may retain the identifier of the NCR-MT. The DU may transmit a message indicating a release of the RRC connection to the NCR-MT, and the NCR-MT may transition to an RRC inactive state or an RRC idle state after release of the RRC connection.

In some examples, the DU may detect a trigger of new side control information for the NCR, and the DU and CU may coordinate to resume the RRC connection of the NCR-MT. The DU may transmit a second message to the CU, and the second message may include a request to initiate a paging of the NCR-MT and the identifier of the NCR-MT. In another example, DU may transmit the second message to the NCR-MT using the retained identifier of the NCR-MT without first exchanging messages with the CU. In some examples, the second message transmitted to the NCR-MT may be a paging message. After receiving the paging message, the NCR-MT may transition to the RRC connected state.

Aspects of the disclosure are initially described in the context of wireless communications systems. Additional aspects of the disclosure are described in the context of an example wireless communications system and an example process flow. Aspects of the disclosure are further illustrated by and described with reference to apparatus diagrams, system diagrams, and flowcharts that relate to techniques for transitioning RRC state of a repeater.

FIG. 1 shows an example of a wireless communications system 100 that supports techniques for transitioning RRC state of a repeater in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for transitioning RRC state of a repeater as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO)

communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some wireless communications systems may include an NCR. The NCR may include an NCR-Fwd and NCR-MT. The NCR-Fwd may perform amplify-and-forward of uplink and downlink radio frequency signals between a network entity 105 and a UE 115 with beamforming capabilities and TDD operations. The NCR-MT may communicate, with the network entity 105 via a control link, side control information, such as control and status signaling, based on a Uu interface. The behavior of the NCR-Fwd may be controlled according to the side control information received by the NCR-MT from the network entity 105, and the NCR-MT supports UE functionality, including RRC states of inactive, idle and connected.

When there is no side control information to exchange, the network entity 105 may release the RRC connection of the NCR-MT to the RRC inactive state. When the NCR-MT enters the RRC inactive state, the NCR-Fwd may operate following the last side control configuration received from the network entity 105. In some examples, the network entity 105 may be implemented in a disaggregated architecture including a CU 160 and a DU 165. The DU 165 may transmit the side control information to the NCR-MT, and the DU 165 may receive side control information from the NCR-MT. The DU 165 may control the NCR operations; however, the CU 160 may control the RRC connection of the NCR-MT. That is, the CU 160 may decide whether to release the RRC connection of the NCR-MT even though the DU 165 may determine that no control information is to be transmitted or received. Additionally, following the release of the RRC connection of the NCR-MT, the CU 160 may decide whether to resume the RRC connection of the NCR-MT even though the DU 165 may have updated side control configuration for the NCR.

In some examples, the DU 165 and CU 160 may coordinate the release of the RRC connection of the NCR-MT. The CU 160 may transmit a control signal to the DU 165 indicating to release the RRC connection of the NCR-MT. The control signal to the DU 165 may include a flag, such as an identifier of the NCR-MT, and the DU 165 may retain the identifier of the NCR-MT. The DU 165 may transmit a message indicating a release of the RRC connection to the NCR-MT, and the NCR-MT may transition to an RRC inactive state or an RRC idle state after release of the RRC connection.

In some examples, the DU 165 may detect a trigger of new side control information for the NCR, and the DU 165 and CU 160 may coordinate to resume the RRC connection of the NCR-MT. The DU 165 may transmit a second message to the CU 160, and the second message may include a request to initiate a paging of the NCR-MT and the identifier of the NCR-MT. In another example, DU 165 may transmit the second message to the NCR-MT using the retained identifier of the NCR-MT without first exchanging messages with the CU 160. In some examples, the second message transmitted to the NCR-MT may be a paging message. After receiving the paging message, the NCR-MT may transition to the RRC connected state.

Figure 2:
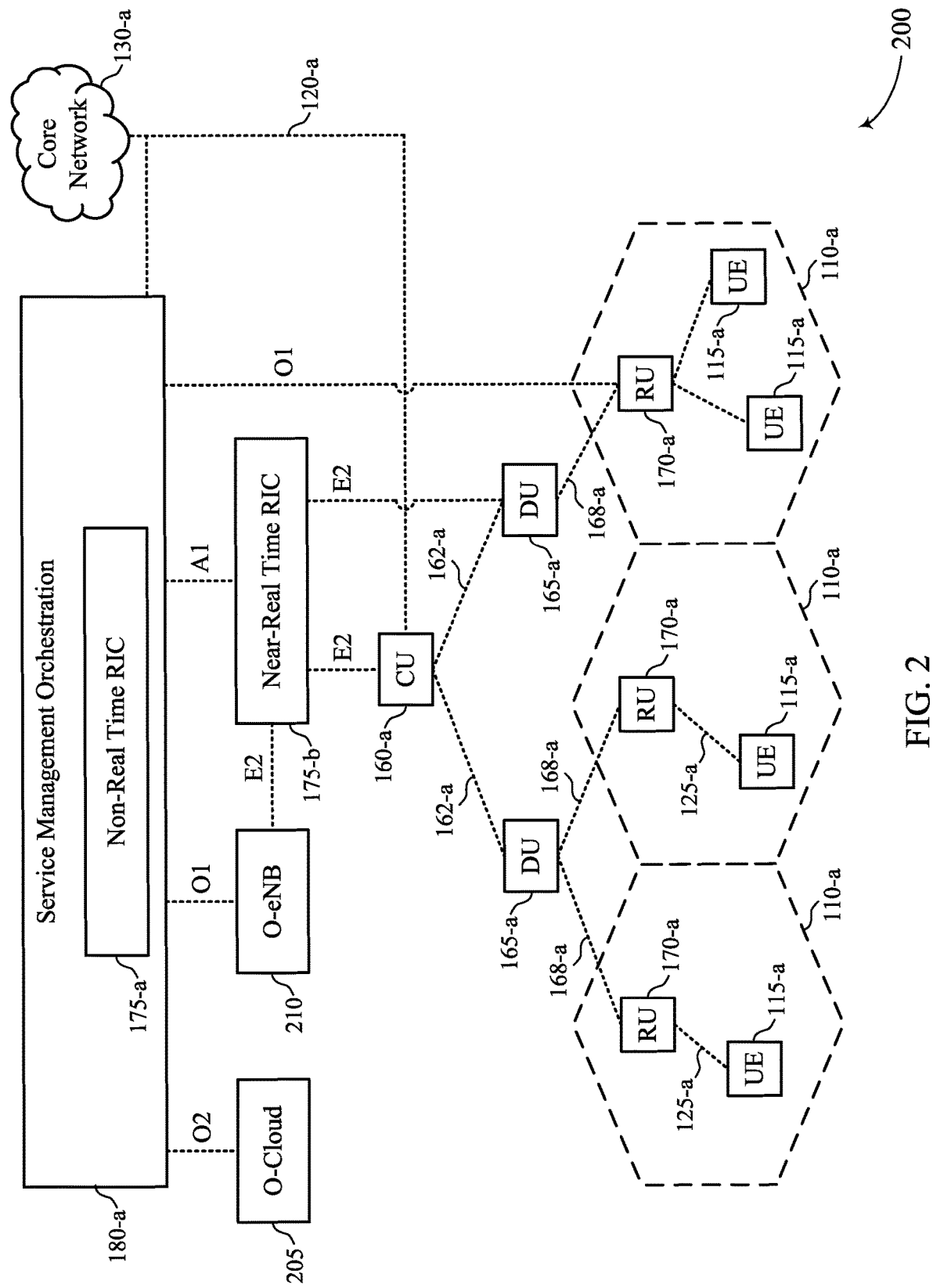
FIG. 2 shows an example of a network architecture that supports techniques for transitioning radio resource control state of a repeater in accordance with one or more aspects of the present disclosure.

FIG. 2 shows an example of a network architecture 200 (e.g., a disaggregated base station architecture, a disaggregated RAN architecture) that supports techniques for transitioning RRC state of a repeater in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a. DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (e.g., via an A1 interface) the Near-RT RIC 175-b. The Near-RT RIC 175-b may be configured to include a logical function that enables near-real-time control and optimization of RAN elements and resources via data collection and actions over an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-a (e.g., reconfiguration via O1) or via generation of RAN management policies (e.g., A1 policies).

Figure 3:
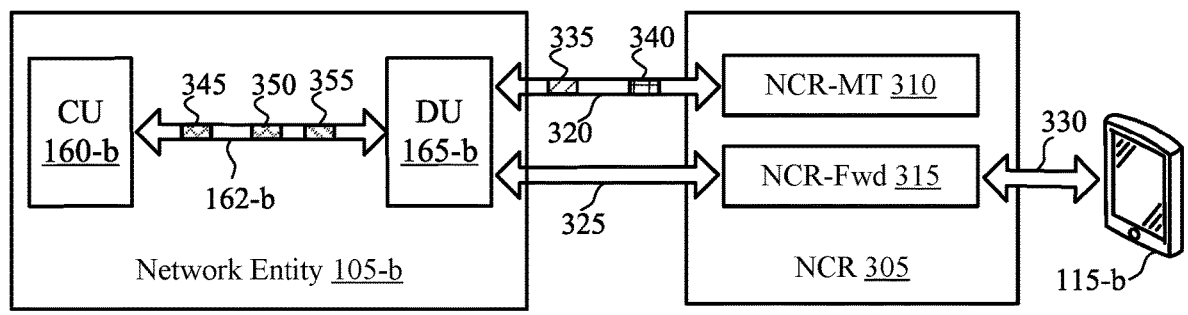
FIG. 3 shows an example of a wireless communications system that supports techniques for transitioning radio resource control state of a repeater in accordance with one or more aspects of the present disclosure.

FIG. 3 shows an example of a wireless communications system 300 that supports techniques for transitioning RRC state of a repeater in accordance with one or more aspects of the present disclosure. The wireless communications system 300 may implement or be implemented by aspects of the wireless communications system 100 and the network architecture 200 as described in FIGS. 1 and 2. For example, the wireless communications system 300 may support signaling and configurations that transition the RRC state of a repeater.

The wireless communications system 300 may include a network entity 105-b and a UE 115-b, which may be examples of network entities 105 and UEs 115 as described with reference to FIG. 1. In some aspects, the network entity 105-b may be implemented in a disaggregated architecture including a CU 160-b and a DU 165-b, which may be examples of the CU 160 and DU 165 as described with reference to FIG. 1. The CU 160-b may communicate with the DU 165-b via a midhaul communication link 162-b.

In some examples, the wireless communications system 300 may include a NCR 305, and the NCR 305 may include includes an NCR-MT 310 and an NCR-Fwd 315. In some aspects, network entity 105-b may communicate with the NCR-MT 310 via a control link 320, and the network entity 105-b may communicate with the NCR-Fwd 315 via a backhaul link 325. The UE 115-b may communicate with the NCR-Fwd 315 via an access link 330 (e.g., a Uu link).

The NCR-Fwd 315 may perform amplify-and-forward of uplink and downlink radio frequency signals (e.g., uplink control signals, uplink data signals, downlink control signals and downlink data signals) between the network entity 105-b and the UE 115-b via the backhaul link 325 and the access link 330. The NCR-MT 310 may exchange side control information with the network entity 105-b via the control link 320, and the control link 320 may be a Uu link.

At least one carrier of the NCR-MT 310 may operate in a frequency band forwarded by the NCR-Fwd 315. Transmission and reception on the control link 320 and the backhaul link 325 may be time division multiplexed or performed simultaneous base on the NCR 305 capability.

The behavior of the NCR-Fwd 315 may be controlled according to the side control information received by the NCR-MT 305 from the network entity 105-*b*. In some examples, the side control information or side control configuration exchanged between the network entity 105-*b* and the NCR-MT 310 may include beam information for the access link 330, TDD uplink or downlink configuration, and on-off information. For example, the side control information may include access link beam indication, such as aperiodic beam indication via downlink control information (DCI) and periodic beam indication via RRC. The access link beam indication may indicate one or multiple beam indices along with associated time resources. The access beam indication may include beam index referring to orbital angular momentum (OAM) configured access beams. The side control information may include back haul beam indication, such as optional beam indication that may be semi-persistent via medium access control-control element (MAC-CE). The optional beam indication may include a beam index that refers to RRC configured beams of the NCR-MT 310. The backhaul beam indication may include predefined rules in case no explicit indication is provided.

In some examples, the side control information may include the NCR-Fwd 315 on-off indication. For example, the on state may be implicitly indicated via the access link beam indication. The NCR-Fwd 315 may be off when the NCR-Fwd 315 has not been indicated as on or within semi-static flexible symbols. In some cases, the side control information may include NCR-Fwd 315 TDD information and transmit/receive (Tx/Rx) timing references; the NCR-MT 310 available side control information may be used without new side control information. In some examples, the side control information may include the NCR-Fwd 315 access link beam configuration, such as OAM provided information characterizing beams to the network entity 105-*b* and NCR 305. For example, the beam configuration may include beam characterization (e.g., quantity of beams, spatial information, direction) up to implementation.

The NCR-MT 310 may support UE functionality, including RRC states of inactive (e.g., RRC_INACTIVE), idle (e.g., RRC_IDLE) and connected (e.g., RRC_CONNECTED). When the NCR-MT 310 is in the RRC connected state or when the NCR-MT 310 has the RRC connection, the NCR-Fwd 315 may be on or off following the side control information received from the network entity 105-*b*. When there is no side control information to exchange between the network entity 105-*b* and the NCR-MT 310, the network entity 105-*b* may release the RRC connection of the NCR-MT from the RRC connected state to the RRC inactive state or RRC idle state. After the NCR-MT 310 enters the RRC inactive state (or RRC idle state), the NCR-Fwd 315 may operate following the last side control configuration received from the network entity 105-*b* while the NCR-MT 310 was in the RRC connected state. For example, the NCR-Fwd 315 may be on or off following the side control information received from the network entity 105-*b*.

In some examples, the network entity 105-*b* may be implemented in a disaggregated architecture including the CU 160-*b* and the DU 165-*b*. For communications between the network entity 105-*b* and the NCR 305, DU 165-*b* may communicate with the NCR-MT 310 via the control link 320, and the DU 165-*b* may communicate with the NCR-Fwd 315 via the backhaul link 325. The DU 165-*b* may transmit the side control information to the NCR MT-310 via the control link 320, and the DU 165-*b* may receive side control information from the NCR-MT 310 via the control link 320. Thus, the DU 165-*c* may control the NCR 305 operations; however, the CU 160-*b* controls the RRC connection state of the NCR-MT 310. That is, the CU 160-*b* may decide whether to release the RRC connection of the NCR-MT 310 even though the DU 165-*b* may determine that no control information is to be transmitted or received. Additionally, following the release of the RRC connection of the NCR-MT 310, the CU 160-*b* may decide whether to resume the RRC connection of the NCR-MT 310 even though the DU 165-*b* may have updated side control configuration for the NCR 305.

To address the issue of the CU 160-*b* deciding whether to release the RRC connection of the NCR-MT 310, although this decision should be within the control of the DU 165-*b*, the DU 165-*b* and CU 160-*b* may coordinate the release of the RRC connection of the NCR-MT 310. In some examples, to coordinate the release of the RRC connection of the NCR-MT 310, the DU 165-*b* may request, to the CU 160-*b*, release of the RRC connection of the NCR-MT 310 and may optionally provide an indication that the NCR 305 be kept operational after release of the RRC connection. For example, the DU 165-*b* may transmit, to the CU 160-*b*, a control signal 345 indicating a request to release the RRC connection of the NCR-MT 310. In some examples, the control signal 345 may include a UE context release request message. Additionally, the control signal may include an indication of an RRC state of the NCR-MT (e.g., RRC inactive or RRC idle) after release of the RRC connection. In some examples, the control signal may include an indication of the NCR 305 remaining operational after release of the RRC connection, the control signal may include a side control configuration for the operation of the NCR 305 after release of the RRC connection.

In another example, the DU 165-*b* and CU 160-*b* may coordinate the release of the RRC connection of the NCR-MT 310 by the CU 160-*b* releasing the RRC connection of the NCR-MT 310 and notifying the DU 165-*b* that the RRC connection of NCR-MT 310 is released to the RRC inactive state, such as adding a flag. In some cases, the CU 160-*b* may optionally provide indication that the NCR-Fwd 315 will remain operational and may provide side control configuration. In some examples, the DU 165-*b* may reject the release. For example, the CU 160-*b* may transmit, to the DU 165-*b*, a control signal 350 indicating to release the RRC connection of the NCR-MT 310, and the control signal 350 may include an identifier of the NCR-MT 310, such as adding a flag to retain context of the NCR-MT 310. In some examples, the CU 160-*b* may provide an indication that the NCR-Fwd 315 will remain operation, and the CU 160-*b* may include side control configuration.

In some examples, the control signal 350 may include an indication to retain a UE context for the NCR-MT 310, and the UE context may include the identifier of the NCR-MT 310. In some examples, the identifier of the NCR-MT 310 may be one F1 application protocol (F1AP) UE identifier or a pair of F1AP UE identifiers associated with the NCR-MT 310. In some examples, the control signal 350 may be a UE context release command message. In some examples, the control signal 350 may be a UE context setup message, a UE context modification message or a UE context new message, and the control signal 350 may include an RRC container to release the RRC connection of the NCR-MT 310. In some examples, the identifier of the NCR-MT 310 may be a RAN UE paging identity (inactive radio network temporary identifier (I-RNTI) associated with the NCR-MT, a CN UE paging identity (e.g., temporary mobile subscriber identity (TMSI) or short TMSI (S-TMSI)) associated with the NCR-MT 310, or a paging identity associated with the NCR-MT 310-*a*.

To release the connection of the NCR-MT 310, the DU 165-*b* may transmit to the NCR-MT 310 a message 335 indicating a release of the RRC connection. In some examples, the DU 165-*b* may transmit to the CU 160-*b* a UE context release complete message indicating that the RRC connection of the NCR-MT 310 has been released.

To address the issue of the CU 160-*b* deciding whether to resume the RRC connection even though the DU 165-*b* needs to update the side control configuration of the NCR 305, the CU 160-*b* may provide the DU 165-*b* with an identifier of the NCR-MT 310, and the DU 165-*b* may retain the identifier of the NCR-MT 310. For example, the CU 160-*b* may provide the DU 165-*c* with the RAN UE paging identity of the NCR-MT (e.g., I-RNTI) during the release of the RRC connection of the NCR-MT 310. When the DU 165-*b* detects a trigger of new side control information for the NCR-MT 310, the DU 165-*b* may use the identifier to page the NCR-MT 310 to trigger RRC connection resume of the NCR-MT 310 and to provide updated side control configuration.

For example, the DU 165-*b* may transmit a message 340 to the NCR-MT 310 indicating to resume the RRC connection of the NCR-MT 310. In some examples, message 340 may include a paging message, and the identifier of the NCR-MT 310 may be a paging identity of the NCR-MT 310. Additional paging assistance information may also be provided, such as paging DRX, a cell ID on which to page, and paging capability.

In another example, to address the issue of the CU 160-*b* deciding whether to resume the RRC connection even though the DU 165-*b* needs to update the side control configuration of the NCR 305, the DU 165-*b* may be able to refer to the NCR-MT 310 using the previously provided identifier of the NCR-MT 310, such as the F1AP identifiers. That is, the DU 165-*b* may retain the identifier(s) of the NCR-MT 310 received from the CU 160-*b* prior to releasing the RRC connection of the NCR-MT 310. Retaining the identifier(s) of the NCR-MT may be based on a prior indication from the CU 160-*b* or based on determining that the NCR 305 may remain operational following the release of the RRC connection.

In some examples, when the DU 165-*b* detects a trigger of new side control information for the NCR-MT 310, the DU 165-*b* may transmit, to the CU 160-*b*, a message 355. The message 355 may indicate to resume the RRC connection of the NCR-MT 310, and the message 355 may include the identifier of the NCR-MT 310. In some examples, the message 355 transmitted to the CU 160-*c* may include a request to initiate a paging of the NCR-MT 310. In some examples, the identifier may include one or more F1AP UE identifiers associated with the NCR-MT 310. In some examples, the message 355 transmitted to the CU 160-*c* may include a side control configuration for a NCR 305 providing an implicit request or trigger to resume the RRC connection of the NCR-MT 310. In response to the message 355, the CU 160-*b* may transmit to the DU 165-*b* a control signal indicating a paging of the NCR-MT 310. In response to receiving the control signal indicating a paging of the NCR-MT 310, the DU 165-*b* may transmit, to the NCR-MT, the message 340 indicating to resume the RRC connection of the NCR-MT 310 (e.g., paging).

In some examples, in response to receiving the message 340 indicating to resume the RRC connection, the NCR-MT 310 may resume the RRC connection. In some cases, the NCR-MT 310 may transmit, to the DU 165-*b*, an RRC resume request message. In response to receiving the RRC resume request message, the DU 165-*a* may transmit, to the CU 160-*b*, a UL RRC message transfer message.

Figure 4:
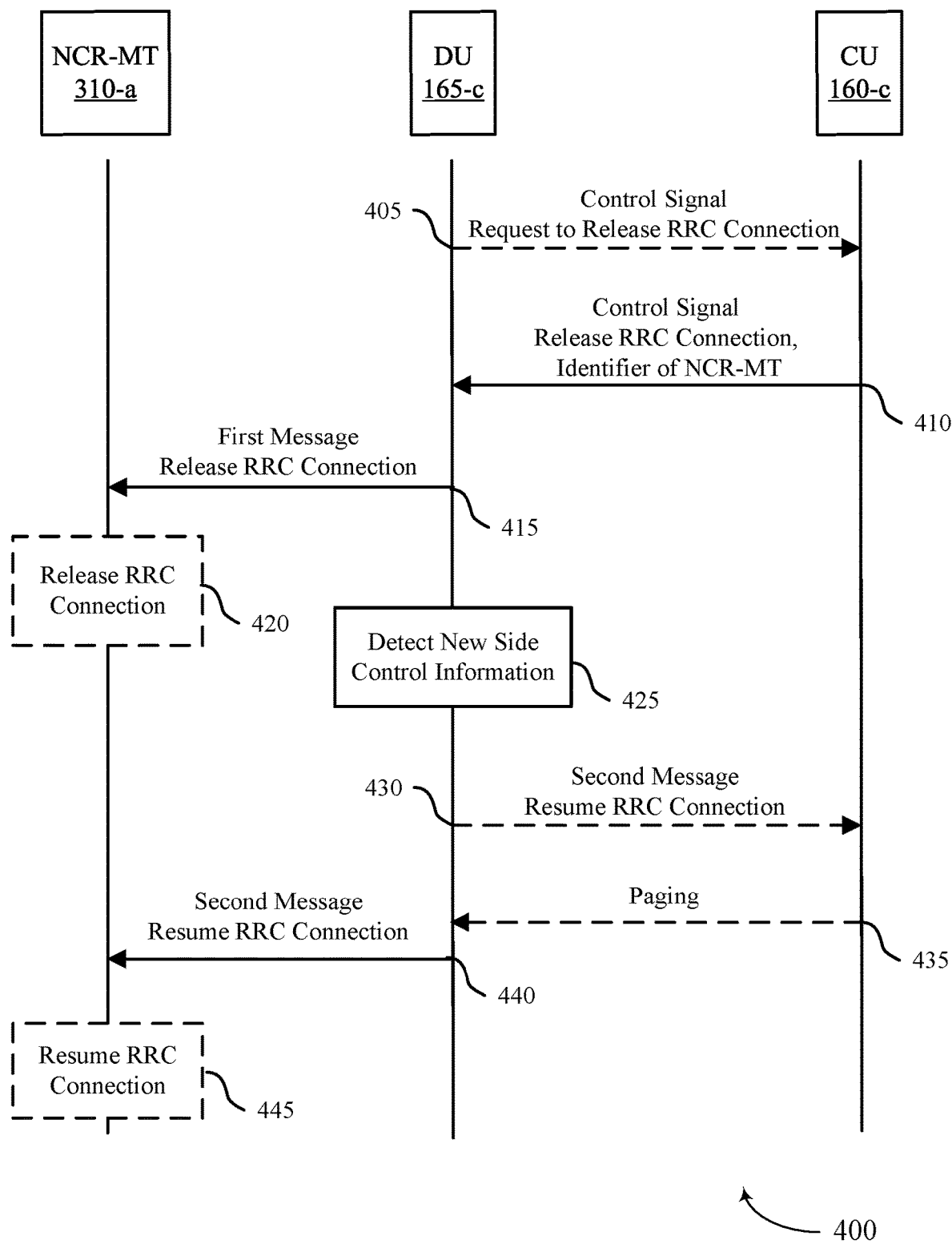
FIG. 4 shows an example of a process flow that supports techniques for transitioning radio resource control state of a repeater in accordance with one or more aspects of the present disclosure.

FIG. 4 shows an example of a process flow 400 that supports techniques for transitioning RRC state of a repeater in accordance with one or more aspects of the present disclosure. In some examples, the process flow 400 may implement or be implemented by aspects of the wireless communications system 100, the network architecture 200 or the wireless communications system 300 as described with reference to FIGS. 1-3, respectively. For example, the process flow 400 may be implemented by a CU 160-*c* and a DU 165-*c*, which may be examples of the CU 160 and the DU 165 as described with reference to FIGS. 1-3. The process flow 400 may be implemented by a NCR-MT 310-*a*, which may be an example of the NCR-MT 310 as described with reference to FIG. 3. In the following description of the process flow 400, the operations between the CU 160-*c*, the DU 165-*c* and the NCR-MT 310-*a* may be transmitted in a different order than the example order shown, or the operations performed by CU 160-*c*, the DU 165-*c* and the NCR-MT 310-*a* may be performed in different orders or at different times. Some operations may also be omitted from the process flow 400, and other operations may be added to the process flow 400.

At 405, optionally, the DU 165-*c* may transmit and the CU 160-*c* may receive a control signal indicating a request to release the RRC connection of the NCR-MT 310-*a*. In some examples, the control signal may include an indication of an RRC state of the NCR-MT (e.g., RRC inactive or RRC idle) after release of the RRC connection. In some examples, the control signal may include an indication of a NCR remaining operational after release of the RRC connection, where the NCR is associated with the NCR-MT. In some examples, the control signal may include a side control configuration for the operation of the NCR after release of the RRC connection.

At 410, the CU 160-*c* may transmit and the DU 165-*c* may receive a first control signal indicating to release the RRC connection of the NCR-MT 310-*a*. The control signal may including an identifier of the NCR-MT 310-*a*. In some examples, the identifier of the NCR-MT 310-*a* may include one or more F 1AP UE identifiers associated with the NCR-MT 310-*a*. In some examples, the identifier may include a paging identity associated with the NCR-MT 310-*a*. In some examples, the first control signal may include an indication of an RRC state of the NCR-MT after release of the RRC connection. In some examples, the first control signal may include an indication of the NCR remaining operational after the release of the RRC connection, where the NCR is associated with the NCR-MT. In some examples, the indication of the NCR remaining operational may include a side control configuration for operation of the NCR after release of the RRC connection.

In some examples, the first control signal may include an indication to retain a UE context for the NCR-MT. In some examples, the UE context may include the identifier of the NCR-MT. In some examples, the first control signal may include a UE context release command message. In some examples, the first control signal may include a UE context setup message, a UE context modification message or a UE context new message, and the first control signal may include an RRC container to release the RRC connection of the NCR-MT. In some examples, the identifier of the NCR-MT may include a RAN UE paging identity associated with the NCR-MT. In some examples, the identifier of the NCR-MT may include a CN UE paging identity associated with the NCR-MT.

At 415, the DU 165-*c* may transmit, to the NCR-MT 310-*a*, a first message indicating a release of the RRC connection.

In some examples, at 420, the NCR-MT 310-*a* may transition to a RRC inactive state or an RRC idle state after release of the RRC connection.

At 425, the DU 165-*c* may detect a trigger of new side control information for the NCR-MT 310-*a*.

In some examples, at 430, the DU 165-*c* may transmit and the CU 160-*c* may receive, in response to the trigger, a second message. The second message may indicate to resume the RRC connection of the NCR-MT, and the second message may include the identifier of the NCR-MT. In some examples, the second message transmitted to the CU 160-*c* may include a request to initiate a paging of the NCR-MT. In some examples, the identifier may include one or more F1AP UE identifiers associated with the NCR-MT. In some examples, the second message transmitted to the CU 160-*c* may include a side control configuration for a NCR associated with the NCR-MT.

In some examples, at 435, the CU 160-*c* may transmit to the DU 165-*c* a control signal indicating a paging of the NCR-MT 310-*a*.

In some examples, at 440, the DU 165-*c* may transmit the second message to the NCR-MT 310-*a*. The second message may indicate to resume the RRC connection of the NCR-MT 310-*a*. In some examples, the second message may include a paging message. In some examples, the identifier of the NCR-MT 310-*a* may include a paging identity. In some examples, the DU 165-*c* may transmit, to the NCR-MT 310-*a*, the second message indicating to resume the RRC connection of the NCR-MT in response to receiving, from the CU 160-*c*, the control signal indicating a paging of the NCR-MT 310-*a*. In some cases, the DU 165-*c* may transmit, to the NCR-MT 310-*a*, the second message indicating to resume the RRC connection of the NCR-MT without receiving, from the CU 160-*c*, the control signal indicating a paging of the NCR-MT 310-*a*.

At 445, the NCR-MT 310-*a* may resume the RRC connection.

Figure 5:
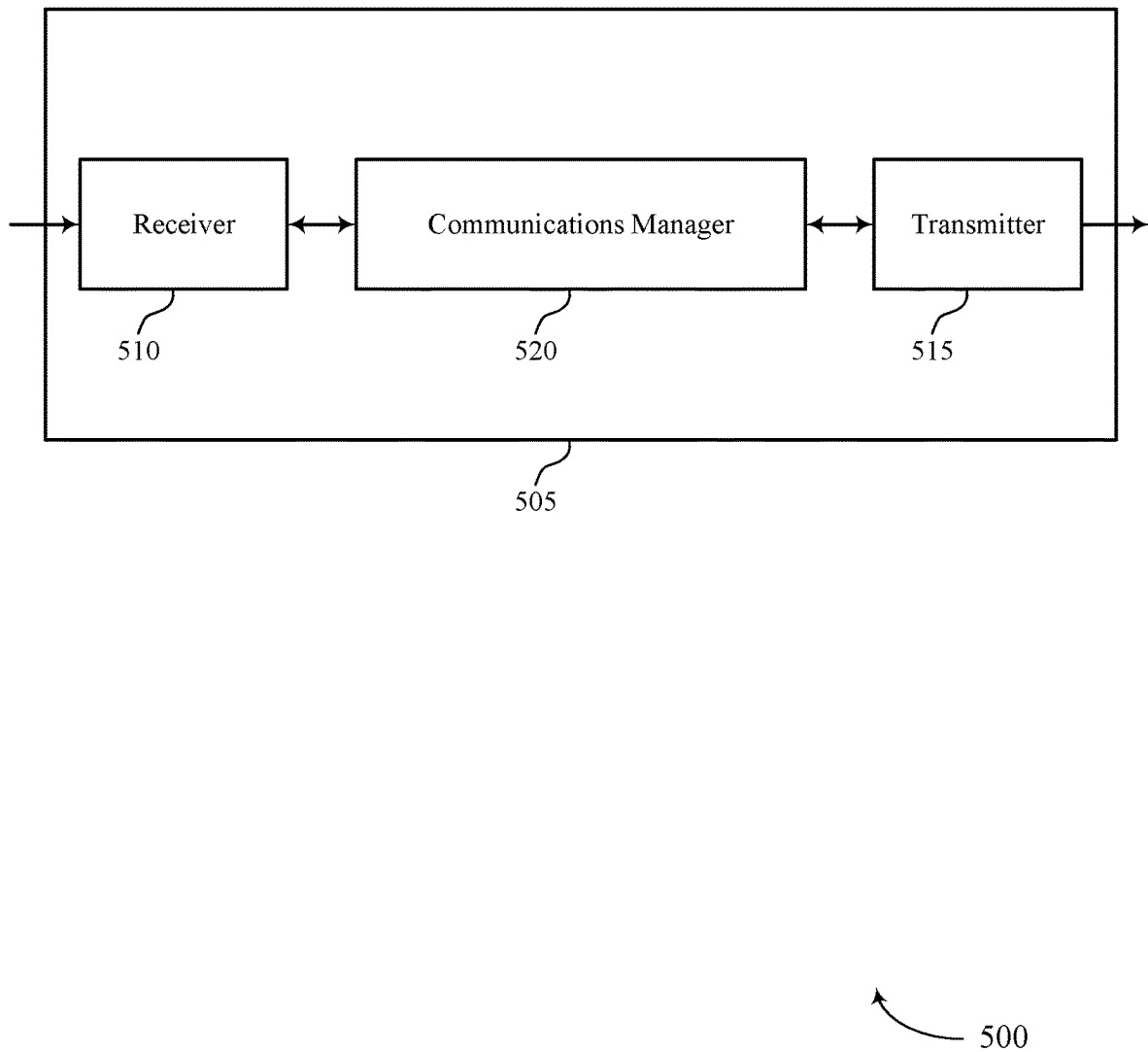
FIGS. 5 and 6 show block diagrams of devices that support techniques for transitioning radio resource control state of a repeater in accordance with one or more aspects of the present disclosure.

FIG. 5 shows a block diagram 500 of a device 505 that supports techniques for transitioning RRC state of a repeater in accordance with one or more aspects of the present disclosure. The device 505 may be an example of aspects of a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of techniques for transitioning RRC state of a repeater as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a distributed unit in accordance with examples as disclosed herein. For example, the communications manager 520 is capable of, configured to, or operable to support a means for receiving, from a central unit (CU), a first control signal indicating to release an RRC connection of a network-controlled repeater mobile termination (NCR-MT), where the first control signal including an identifier of the NCR-MT. The communications manager 520 is capable of, configured to, or operable to support a means for transmitting, to the NCR-MT, a first message indicating a release of the RRC connection. The communications manager 520 is capable of, configured to, or operable to support a means for detecting a trigger of new side control information for the NCR-MT. The communications manager 520 is capable of, configured to, or operable to support a means for transmitting a second message, in response to the trigger, indicating to resume the RRC connection of the NCR-MT, where the second message including the identifier of the NCR-MT.

Additionally, or alternatively, the communications manager 520 may support wireless communications at a central unit in accordance with examples as disclosed herein. For example, the communications manager 520 is capable of, configured to, or operable to support a means for transmitting, to a distributed unit (DU), a first control signal indicating to release an RRC connection of a NCR-MT, where the first control signal including an identifier of the NCR-MT. The communications manager 520 is capable of, configured to, or operable to support a means for receiving, from the DU, a second message indicating to resume the RRC connection of the NCR-MT.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced power consumption and more efficient utilization of communication resources.

Figure 6:
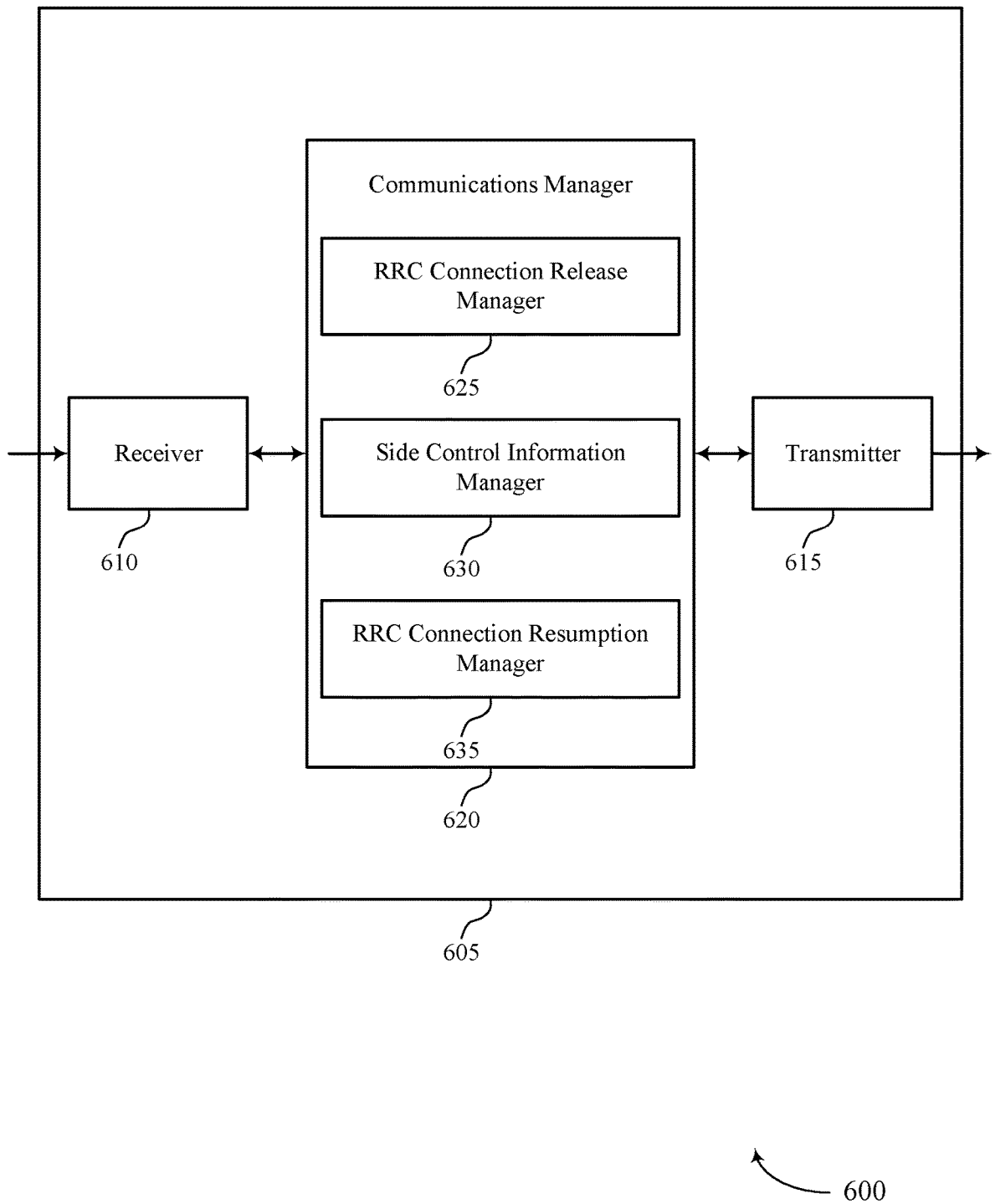

FIG. 6 shows a block diagram 600 of a device 605 that supports techniques for transitioning RRC state of a repeater in accordance with one or more aspects of the present disclosure. The device 605 may be an example of aspects of a device 505 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of techniques for transitioning RRC state of a repeater as described herein. For example, the communications manager 620 may include an RRC connection release manager 625, a side control information manager 630, an RRC connection resumption manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a distributed unit in accordance with examples as disclosed herein. The RRC connection release manager 625 is capable of, configured to, or operable to support a means for receiving, from a central unit (CU), a first control signal indicating to release an RRC connection of a NCR-MT, where the first control signal including an identifier of the NCR-MT. The RRC connection release manager 625 is capable of, configured to, or operable to support a means for transmitting, to the NCR-MT, a first message indicating a release of the RRC connection. The side control information manager 630 is capable of, configured to, or operable to support a means for detecting a trigger of new side control information for the NCR-MT. The RRC connection resumption manager 635 is capable of, configured to, or operable to support a means for transmitting a second message, in response to the trigger, indicating to resume the RRC connection of the NCR-MT, where the second message including the identifier of the NCR-MT.

Additionally, or alternatively, the communications manager 620 may support wireless communications at a central unit in accordance with examples as disclosed herein. The RRC connection release manager 625 is capable of, configured to, or operable to support a means for transmitting, to a distributed unit (DU), a first control signal indicating to release an RRC connection of a NCR-MT, where the first control signal including an identifier of the NCR-MT. The RRC connection resumption manager 635 is capable of, configured to, or operable to support a means for receiving, from the DU, a second message indicating to resume the RRC connection of the NCR-MT.

Figure 7:
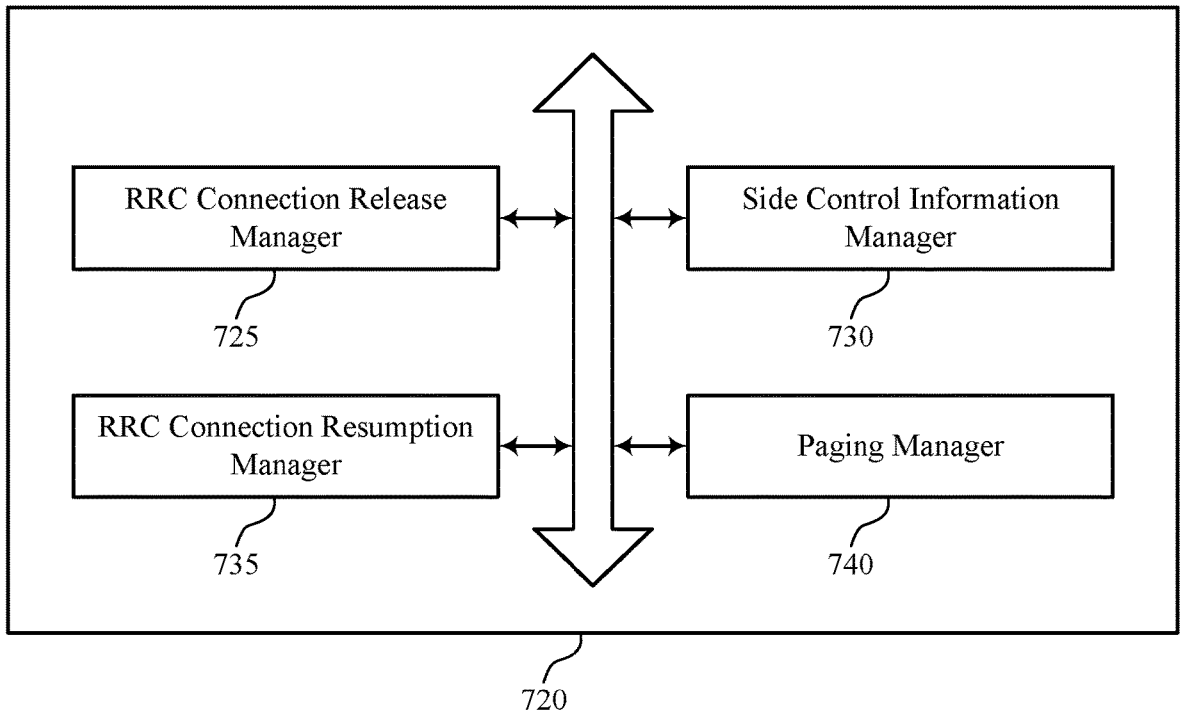
FIG. 7 shows a block diagram of a communications manager that supports techniques for transitioning radio resource control state of a repeater in accordance with one or more aspects of the present disclosure.

FIG. 7 shows a block diagram 700 of a communications manager 720 that supports techniques for transitioning RRC state of a repeater in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for transitioning RRC state of a repeater as described herein. For example, the communications manager 720 may include an RRC connection release manager 725, a side control information manager 730, an RRC connection resumption manager 735, a paging manager 740, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communications at a distributed unit in accordance with examples as disclosed herein. The RRC connection release manager 725 is capable of, configured to, or operable to support a means for receiving, from a central unit (CU), a first control signal indicating to release an RRC connection of a NCR-MT, where the first control signal including an identifier of the NCR-MT. In some examples, the RRC connection release manager 725 is capable of, configured to, or operable to support a means for transmitting, to the NCR-MT, a first message indicating a release of the RRC connection. The side control information manager 730 is capable of, configured to, or operable to support a means for detecting a trigger of new side control information for the NCR-MT. The RRC connection resumption manager 735 is capable of, configured to, or operable to support a means for transmitting a second message, in response to the trigger, indicating to resume the RRC connection of the NCR-MT, where the second message including the identifier of the NCR-MT.

In some examples, the identifier of the NCR-MT including one or more F1AP UE identifiers associated with the NCR-MT.

In some examples, to support transmitting the second message, the paging manager 740 is capable of, configured to, or operable to support a means for transmitting the second message to the CU, where the second message including a request to initiate a paging of the NCR-MT.

In some examples, the identifier including one or more F1AP UE identifiers associated with the NCR-MT.

In some examples, to support transmitting the second message, the side control information manager 730 is capable of, configured to, or operable to support a means for transmitting the second message to the CU, where the second message including a side control configuration for a NCR associated with the NCR-MT.

In some examples, to support transmitting the second message, the paging manager 740 is capable of, configured to, or operable to support a means for transmitting the second message to the NCR-MT, where the second message including a paging message.

In some examples, the identifier including a paging identity.

In some examples, the NCR-MT transitions to an RRC inactive state or an RRC idle state after release of the RRC connection.

In some examples, the RRC connection release manager 725 is capable of, configured to, or operable to support a means for transmitting, to the CU, a second control signal indicating a request to release the RRC connection of the NCR-MT, where the receiving the first control signal is in response to the second control signaling.

In some examples, the second control signal including an indication of an RRC state of the NCR-MT after release of the RRC connection.

In some examples, the second control signal including an indication of a NCR remaining operational after release of the RRC connection, the NCR is associated with the NCR-MT.

In some examples, the second control signal including a side control configuration for the operation of the NCR after release of the RRC connection.

In some examples, the first control signal including an indication of an RRC state of the NCR-MT after release of the RRC connection.

In some examples, the first control signal including an indication of a NCR remaining operational after release of the RRC connection. In some examples, the NCR is associated with the NCR-MT.

In some examples, the indication of the NCR remaining operational includes a side control configuration for operation of the NCR after release of the RRC connection.

In some examples, the first control signal including an indication to retain a UE context for the NCR-MT.

In some examples, the UE context including the identifier of the NCR-MT.

In some examples, the first control signal including a UE context release command message.

In some examples, the first control signal including a UE context setup message or a UE context modification message or a new message. In some examples, first control signal including an RRC container to release the RRC connection of the NCR-MT.

In some examples, the identifier of the NCR-MT including a RAN UE paging identity of the NCR-MT.

In some examples, the identifier of the NCR-MT including a core network (CN) UE paging identity associated with the NCR-MT.

Additionally, or alternatively, the communications manager 720 may support wireless communications at a central unit in accordance with examples as disclosed herein. In some examples, the RRC connection release manager 725 is capable of, configured to, or operable to support a means for transmitting, to a distributed unit (DU), a first control signal indicating to release an RRC connection of a NCR-MT, where the first control signal including an identifier of the NCR-MT. In some examples, the RRC connection resumption manager 735 is capable of, configured to, or operable to support a means for receiving, from the DU, a second message indicating to resume the RRC connection of the NCR-MT.

In some examples, the identifier of the NCR-MT including one or more F1AP UE identifiers associated with the NCR-MT.

In some examples, the second message including a request to initiate a paging of the NCR-MT.

In some examples, the identifier including one or more F1AP UE identifiers associated with the NCR-MT.

In some examples, the second message including a side control configuration for a NCR associated with the NCR-MT.

In some examples, the identifier including a paging identity.

In some examples, the NCR-MT transitions to an RRC inactive state or an RRC idle state after release of the RRC connection.

In some examples, the RRC connection release manager 725 is capable of, configured to, or operable to support a means for receiving, from the DU, a second control signal indicating a request to release the RRC connection of the NCR-MT, where the transmitting the first control signal is in response to the second control signal.

In some examples, the second control signal including an indication of an RRC state of the NCR-MT after release of the RRC connection.

In some examples, the second control signal including an indication of a NCR remaining operational after release of the RRC connection, the NCR is associated with the NCR-MT.

In some examples, the second control signal including a side control configuration for the operation of the NCR after release of the RRC connection.

In some examples, the first control signal including an indication of an RRC state of the NCR-MT after release of the RRC connection.

In some examples, the first control signal including an indication of a NCR remaining operational after release of the RRC connection. In some examples, the NCR is associated with the NCR-MT.

In some examples, the indication of the NCR remaining operational includes a side control configuration for operation of the NCR after release of the RRC connection.

In some examples, the first control signal including an indication to retain a UE context for the NCR-MT.

In some examples, the UE context including the identifier of the NCR-MT.

In some examples, the first control signal including a UE context release command message.

In some examples, the first control signal including a UE context setup message or a UE context modification message or a new message. In some examples, first control signal including an RRC container to release the RRC connection of the NCR-MT.

In some examples, the identifier of the NCR-MT including a RAN UE paging identity of the NCR-MT.

In some examples, the identifier of the NCR-MT including a CN UE paging identity associated with the NCR-MT.

Figure 8:
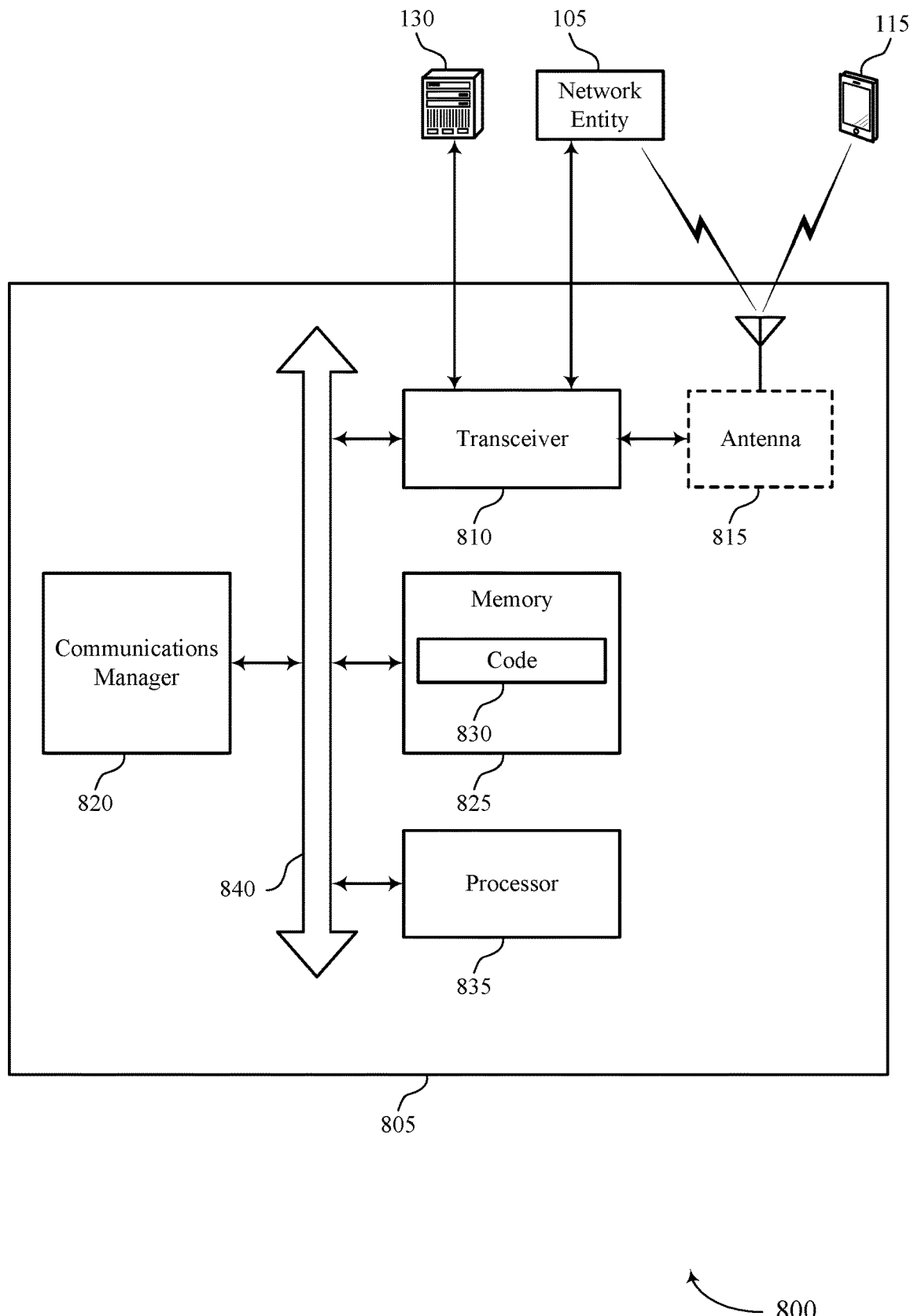
FIG. 8 shows a diagram of a system including a device that supports techniques for transitioning radio resource control state of a repeater in accordance with one or more aspects of the present disclosure.

FIG. 8 shows a diagram of a system 800 including a device 805 that supports techniques for transitioning RRC state of a repeater in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof. In some implementations, the transceiver 810 may include or be configured for coupling with one or more processors or memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or memory components (for example, the processor 835, or the memory 825, or both), may be included in a chip or chip assembly that is installed in the device 805. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting techniques for transitioning RRC state of a repeater). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805. The processor 835 may be any one or more suitable processors capable of executing scripts or instructions of one or more software programs stored in the device 805 (such as within the memory 825). In some implementations, the processor 835 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 835, or the transceiver 810, or the communications manager 820, or other components or combinations of components of the device 805. The processing system of the device 805 may interface with other components of the device 805, and may process information received from other components (such as inputs or signals) or output information to other components. For example, a chip or modem of the device 805 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 805 may transmit information output from the chip or modem. Additionally, or alternatively, in some implementations, the one or more interfaces may refer to an interface between the processing system of the chip or modem and a receiver, such that the device 805 may obtain information or signal inputs, and the information may be passed to the processing system. A person having ordinary skill in the art will readily recognize that a first interface also may obtain information or signal inputs, and a second interface also may output information or signal outputs.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communications at a distributed unit in accordance with examples as disclosed herein. For example, the communications manager 820 is capable of, configured to, or operable to support a means for receiving, from a central unit (CU), a first control signal indicating to release an RRC connection of a NCR-MT, where the first control signal including an identifier of the NCR-MT. The communications manager 820 is capable of, configured to, or operable to support a means for transmitting, to the NCR-MT, a first message indicating a release of the RRC connection. The communications manager 820 is capable of, configured to, or operable to support a means for detecting a trigger of new side control information for the NCR-MT. The communications manager 820 is capable of, configured to, or operable to support a means for transmitting a second message, in response to the trigger, indicating to resume the RRC connection of the NCR-MT, where the second message including the identifier of the NCR-MT.

Additionally, or alternatively, the communications manager 820 may support wireless communications at a central unit in accordance with examples as disclosed herein. For example, the communications manager 820 is capable of, configured to, or operable to support a means for transmitting, to a distributed unit (DU), a first control signal indicating to release an RRC connection of a NCR-MT, where the first control signal including an identifier of the NCR-MT. The communications manager 820 is capable of, configured to, or operable to support a means for receiving, from the DU, a second message indicating to resume the RRC connection of the NCR-MT.

By including or configuring the communications manager 820 in accordance with examples as described herein, the device 805 may support techniques for improved communication reliability, reduced power consumption, more efficient utilization of communication resources, and improved coordination between devices.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the transceiver 810, the processor 835, the memory 825, the code 830, or any combination thereof. For example, the code 830 may include instructions executable by the processor 835 to cause the device 805 to perform various aspects of techniques for transitioning RRC state of a repeater as described herein, or the processor 835 and the memory 825 may be otherwise configured to perform or support such operations.

Figure 9:
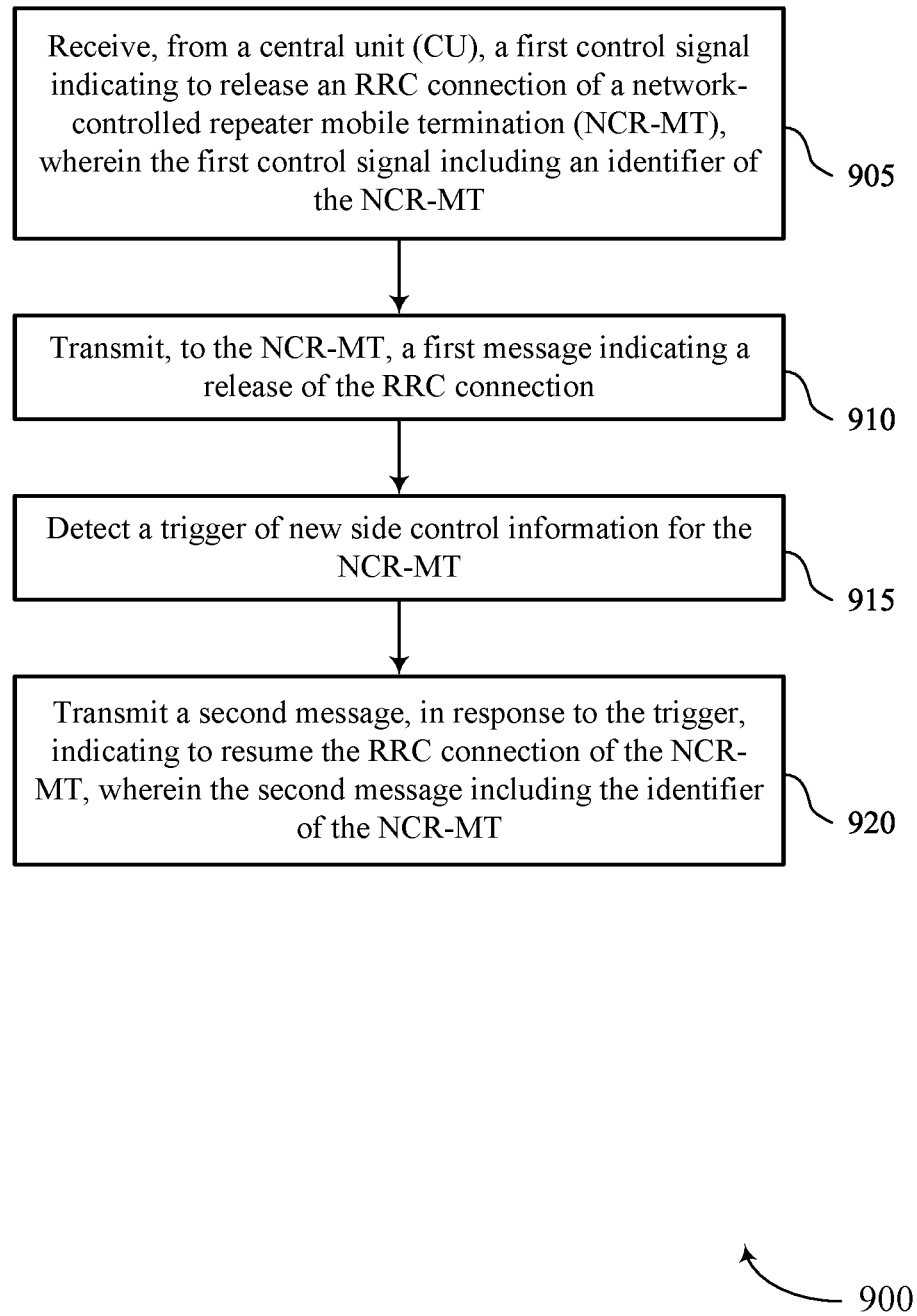
FIGS. 9 through 11 show flowcharts illustrating methods that support techniques for transitioning radio resource control state of a repeater in accordance with one or more aspects of the present disclosure.

FIG. 9 shows a flowchart illustrating a method 900 that supports techniques for transitioning RRC state of a repeater in accordance with aspects of the present disclosure. The operations of the method 900 may be implemented by a network entity or its components as described herein. For example, the operations of the method 900 may be performed by a network entity as described with reference to FIGS. 1 through 8. In some examples, a network entity may execute a set of instructions to control the functional elements of the wireless network entity to perform the described functions. Additionally, or alternatively, the wireless network entity may perform aspects of the described functions using special-purpose hardware.

At 905, the method may include receiving, from a central unit (CU), a first control signal indicating to release an RRC connection of a NCR-MT, wherein the first control signal comprising an identifier of the NCR-MT. The operations of 905 may be performed in accordance with examples as disclosed herein. In some examples, aspects of the operations of 905 may be performed by an RRC connection release manager 725 as described with reference to FIG. 7.

At 910, the method may include transmitting, to the NCR-MT, a first message indicating a release of the RRC connection. The operations of 910 may be performed in accordance with examples as disclosed herein. In some examples, aspects of the operations of 910 may be performed by an RRC connection release manager 725 as described with reference to FIG. 7.

At 915, the method may include detecting a trigger of new side control information for the NCR-MT. The operations of 915 may be performed in accordance with examples as disclosed herein. In some examples, aspects of the operations of 915 may be performed by a side control information manager 730 as described with reference to FIG. 7.

At 920, the method may include transmitting a second message, in response to the trigger, indicating to resume the RRC connection of the NCR-MT, wherein the second message comprising the identifier of the NCR-MT. The operations of 920 may be performed in accordance with examples as disclosed herein. In some examples, aspects of the operations of 920 may be performed by an RRC connection resumption manager 735 as described with reference to FIG. 7.

Figure 10:
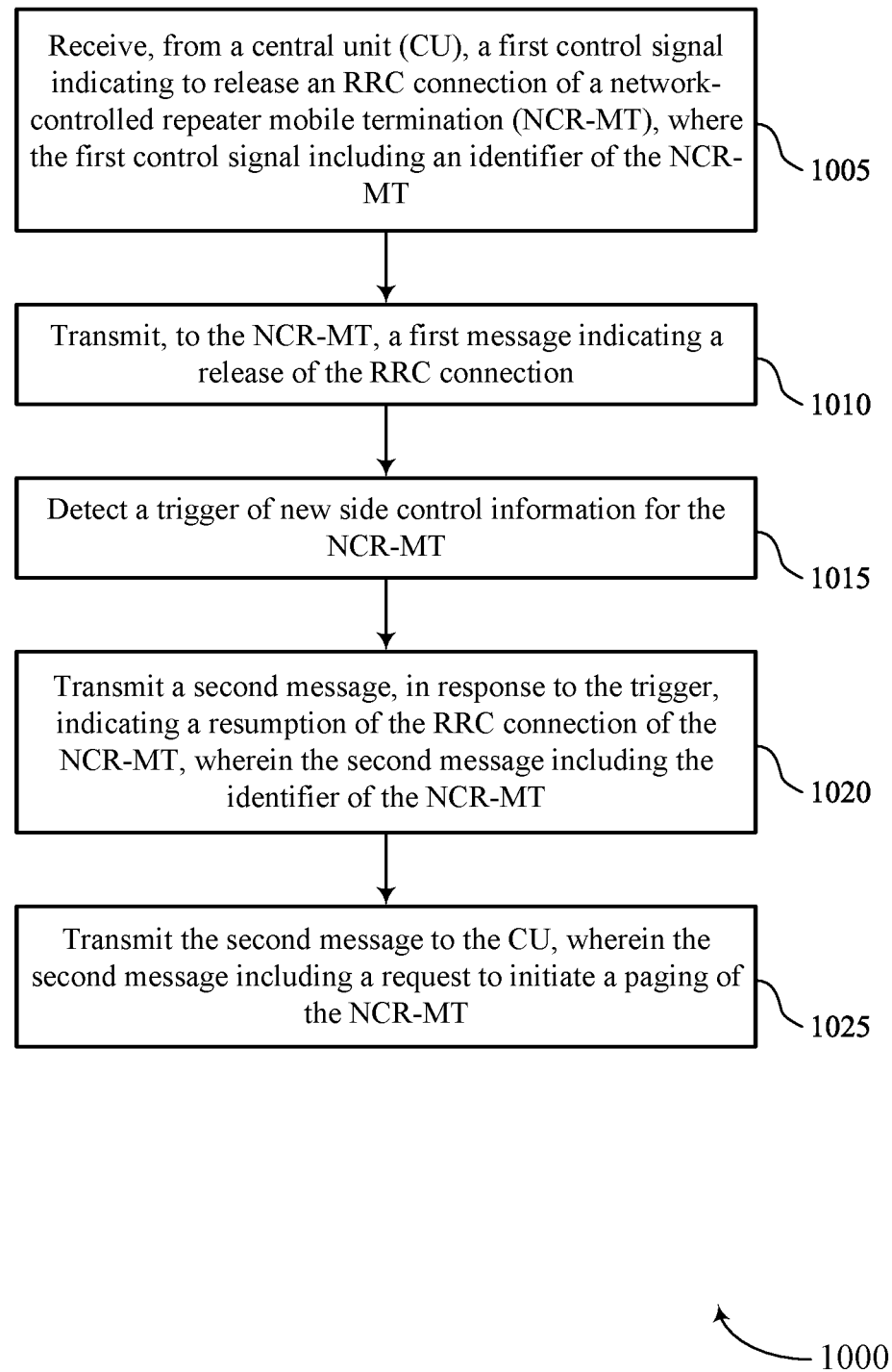

FIG. 10 shows a flowchart illustrating a method 1000 that supports techniques for transitioning RRC state of a repeater in accordance with aspects of the present disclosure. The operations of the method 1000 may be implemented by a network entity or its components as described herein. For example, the operations of the method 1000 may be performed by a network entity as described with reference to FIGS. 1 through 8. In some examples, a network entity may execute a set of instructions to control the functional elements of the wireless network entity to perform the described functions. Additionally, or alternatively, the wireless network entity may perform aspects of the described functions using special-purpose hardware.

At 1005, the method may include receiving, from a central unit (CU), a first control signal indicating to release an RRC connection of a NCR-MT, wherein the first control signal comprising an identifier of the NCR-MT. The operations of 1005 may be performed in accordance with examples as disclosed herein. In some examples, aspects of the operations of 1005 may be performed by an RRC connection release manager 725 as described with reference to FIG. 7.

At 1010, the method may include transmitting, to the NCR-MT, a first message indicating a release of the RRC connection. The operations of 1010 may be performed in accordance with examples as disclosed herein. In some examples, aspects of the operations of 1010 may be performed by an RRC connection release manager 725 as described with reference to FIG. 7.

At 1015, the method may include detecting a trigger of new side control information for the NCR-MT. The operations of 1015 may be performed in accordance with examples as disclosed herein. In some examples, aspects of the operations of 1015 may be performed by a side control information manager 730 as described with reference to FIG. 7.

At 1020, the method may include transmitting a second message, in response to the trigger, indicating to resume the RRC connection of the NCR-MT, wherein the second message comprising the identifier of the NCR-MT. The operations of 1020 may be performed in accordance with examples as disclosed herein. In some examples, aspects of the operations of 1020 may be performed by an RRC connection resumption manager 735 as described with reference to FIG. 7.

At 1025, the method may include transmitting the second message to the CU, wherein the second message comprising a request to initiate a paging of the NCR-MT. The operations of 1025 may be performed in accordance with examples as disclosed herein. In some examples, aspects of the operations of 1025 may be performed by a paging manager 740 as described with reference to FIG. 7.

Figure 11:
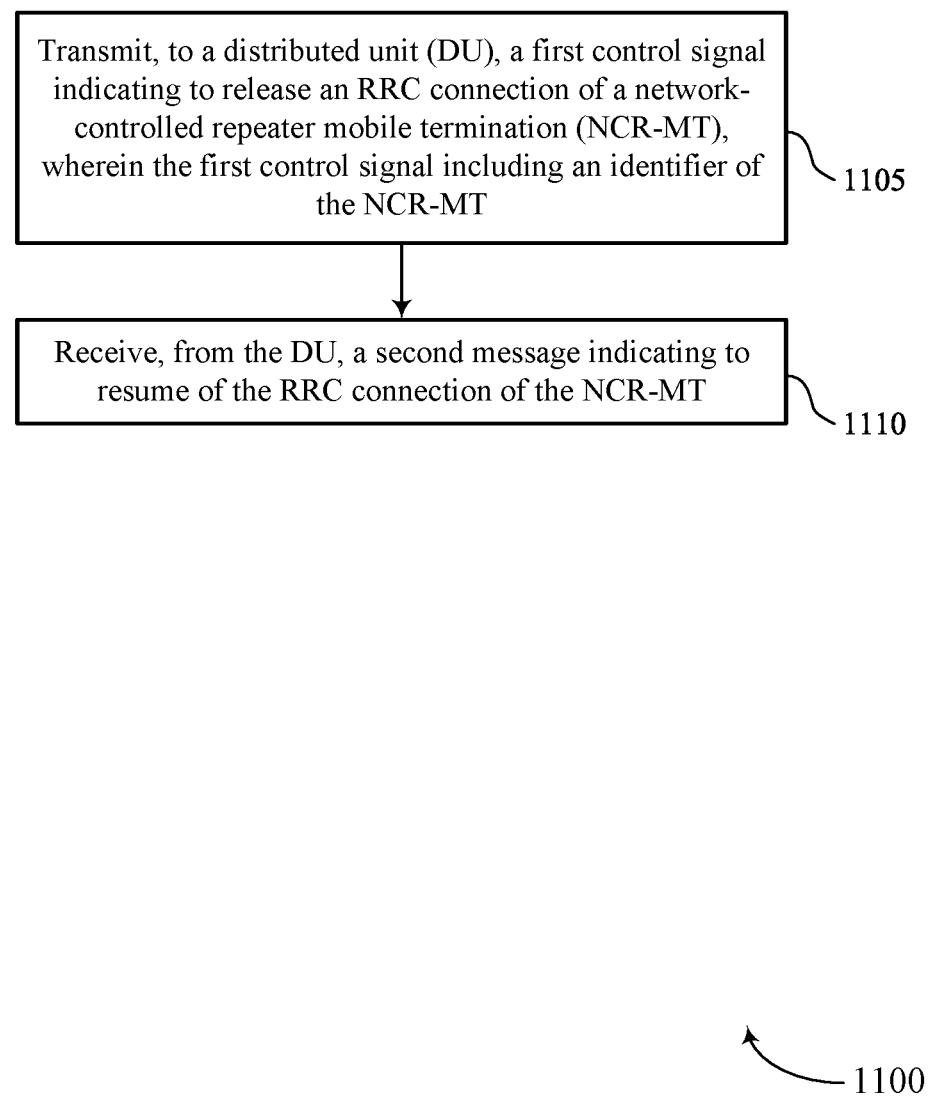

FIG. 11 shows a flowchart illustrating a method 1100 that supports techniques for transitioning RRC state of a repeater in accordance with aspects of the present disclosure. The operations of the method 1100 may be implemented by a network entity or its components as described herein. For example, the operations of the method 1100 may be performed by a network entity as described with reference to FIGS. 1 through 8. In some examples, a network entity may execute a set of instructions to control the functional elements of the wireless network entity to perform the described functions. Additionally, or alternatively, the wireless network entity may perform aspects of the described functions using special-purpose hardware.

At 1105, the method may include transmitting, to a DU, a first control signal indicating to release an RRC connection of a NCR-MT, wherein the first control signal comprising an identifier of the NCR-MT. The operations of 1105 may be performed in accordance with examples as disclosed herein. In some examples, aspects of the operations of 1105 may be performed by an RRC connection release manager 725 as described with reference to FIG. 7.

At 1110, the method may include receiving, from the DU, a second message indicating to resume the RRC connection of the NCR-MT. The operations of 1110 may be performed in accordance with examples as disclosed herein. In some examples, aspects of the operations of 1110 may be performed by an RRC connection resumption manager 735 as described with reference to FIG. 7.

The following provides an overview of aspects of the present disclosure:

Aspect 1: A method for wireless communications at a distributed unit, comprising: receiving, from a CU, a first control signal indicating to release an RRC connection of a NCR-MT, wherein the first control signal comprising an identifier of the NCR-MT; transmitting, to the NCR-MT, a first message indicating a release of the RRC connection; detecting a trigger of new side control information for the NCR-MT; and transmitting a second message, in response to the trigger, indicating to resume the RRC connection of the NCR-MT, wherein the second message comprising the identifier of the NCR-MT.

Aspect 2: The method of aspect 1, wherein the identifier of the NCR-MT comprising one or more F1AP UE identifiers associated with the NCR-MT.

Aspect 3: The method of any of aspects 1 through 2, wherein transmitting the second message comprises: transmitting the second message to the CU, wherein the second message comprising a request to initiate a paging of the NCR-MT.

Aspect 4: The method of aspect 3, wherein the identifier comprising one or more F1AP UE identifiers associated with the NCR-MT.

Aspect 5: The method of any of aspects 1 through 4, wherein transmitting the second message comprises: transmitting the second message to the CU, wherein the second message comprising a side control configuration for a NCR associated with the NCR-MT.

Aspect 6: The method of any of aspects 1 through 5, wherein transmitting the second message comprises: transmitting the second message to the NCR-MT, wherein the second message comprising a paging message.

Aspect 7: The method of any of aspects 1 through 6, wherein the identifier comprising a paging identity.

Aspect 8: The method of any of aspects 1 through 7, wherein the NCR-MT transitions to an RRC inactive state or an RRC idle state after release of the RRC connection.

Aspect 9: The method of any of aspects 1 through 8, wherein the receiving the first control signal further comprising: transmitting, to the CU, a second control signal indicating a request to release the RRC connection of the NCR-MT, wherein the receiving the first control signal is in response to the second control signaling.

Aspect 10: The method of aspect 9, wherein the second control signal comprising an indication of an RRC state of the NCR-MT after release of the RRC connection.

Aspect 11: The method of any of aspects 9 through 10, wherein the second control signal comprising an indication of a NCR remaining operational after release of the RRC connection, the NCR is associated with the NCR-MT.

Aspect 12: The method of aspect 11, wherein the second control signal comprising a side control configuration for the operation of the NCR after release of the RRC connection.

Aspect 13: The method of any of aspects 1 through 12, wherein the first control signal comprising an indication of an RRC state of the NCR-MT after release of the RRC connection.

Aspect 14: The method of any of aspects 1 through 13, wherein the first control signal comprising an indication of a NCR remaining operational after release of the RRC connection, the NCR is associated with the NCR-MT.

Aspect 15: The method of aspect 14, wherein the indication of the NCR remaining operational includes a side control configuration for operation of the NCR after release of the RRC connection.

Aspect 16: The method of any of aspects 1 through 15, wherein the first control signal comprising an indication to retain a UE context for the NCR-MT.

Aspect 17: The method of aspect 16, wherein the UE context comprising the identifier of the NCR-MT.

Aspect 18: The method of any of aspects 1 through 17, wherein the first control signal comprising a UE context release command message.

Aspect 19: The method of any of aspects 1 through 18, wherein the first control signal comprising a UE context setup message or a UE context modification message or a new message, first control signal comprising an RRC container to release the RRC connection of the NCR-MT.

Aspect 20: The method of any of aspects 1 through 19, wherein the identifier of the NCR-MT comprising a RAN UE paging identity of the NCR-MT.

Aspect 21: The method of any of aspects 1 through 20, wherein the identifier of the NCR-MT comprising a CN UE paging identity associated with the NCR-MT.

Aspect 22: A method for wireless communications at a central unit, comprising: transmitting, to a DU, a first control signal indicating to release an RRC connection of a NCR-MT, wherein the first control signal including an identifier of the NCR-MT; and receiving, from the DU, a second message indicating to resume the RRC connection of the NCR-MT.

Aspect 23: The method of aspect 22, wherein the identifier of the NCR-MT comprising one or more F1AP UE identifiers associated with the NCR-MT.

Aspect 24: The method of any of aspects 22 through 23, wherein the second message comprising a request to initiate a paging of the NCR-MT.

Aspect 25: The method of aspect 24, wherein the identifier comprising one or more F1AP UE identifiers associated with the NCR-MT.

Aspect 26: The method of any of aspects 22 through 25, wherein the second message comprising a side control configuration for a network-controlled repeater (NCR) associated with the NCR-MT.

Aspect 27: The method of any of aspects 22 through 26, wherein the identifier comprising a paging identity.

Aspect 28: The method of any of aspects 22 through 27, wherein the NCR-MT transitions to an RRC inactive state or an RRC idle state after release of the RRC connection.

Aspect 29: The method of any of aspects 22 through 28, wherein the receiving the first control signal further comprising: receiving, from the DU, a second control signal indicating a request to release the RRC connection of the NCR-MT, wherein the transmitting the first control signal is in response to the second control signal.

Aspect 30: The method of aspect 29, wherein the second control signal comprising an indication of an RRC state of the NCR-MT after release of the RRC connection.

Aspect 31: The method of any of aspects 29 through 30, wherein the second control signal comprising an indication of a NCR remaining operational after release of the RRC connection, the NCR is associated with the NCR-MT.

Aspect 32: The method of aspect 31, wherein the second control signal comprising a side control configuration for the operation of the NCR after release of the RRC connection.

Aspect 33: The method of any of aspects 22 through 32, wherein the first control signal comprising an indication of an RRC state of the NCR-MT after release of the RRC connection.

Aspect 34: The method of any of aspects 22 through 33, wherein the first control signal comprising an indication of a NCR remaining operational after release of the RRC connection, the NCR is associated with the NCR-MT.

Aspect 35: The method of aspect 34, wherein the indication of the NCR remaining operational includes a side control configuration for operation of the NCR after release of the RRC connection.

Aspect 36: The method of any of aspects 22 through 35, wherein the first control signal comprising an indication to retain a UE context for the NCR-MT.

Aspect 37: The method of aspect 36, wherein the UE context comprising the identifier of the NCR-MT.

Aspect 38: The method of any of aspects 22 through 37, wherein the first control signal comprising a UE context release command message.

Aspect 39: The method of any of aspects 22 through 38, wherein the first control signal comprising a UE context setup message or a UE context modification message or a new message, first control signal comprising an RRC container to release the RRC connection of the NCR-MT.

Aspect 40: The method of any of aspects 22 through 39, wherein the identifier of the NCR-MT comprising a RAN UE paging identity of the NCR-MT.

Aspect 41: The method of any of aspects 22 through 40, wherein the identifier of the NCR-MT comprising a CN UE paging identity associated with the NCR-MT.

Aspect 42: An apparatus for wireless communications at a distributed unit, comprising a processor; memory coupled with the processor; and instructions stored in the memory and executable by the processor to cause the apparatus to perform a method of any of aspects 1 through 21.

Aspect 43: An apparatus for wireless communications at a distributed unit, comprising at least one means for performing a method of any of aspects 1 through 21.

Aspect 44: A non-transitory computer-readable medium storing code for wireless communications at a distributed unit, the code comprising instructions executable by a processor to perform a method of any of aspects 1 through 21.

Aspect 45: An apparatus for wireless communications at a central unit, comprising a processor; memory coupled with the processor; and instructions stored in the memory and executable by the processor to cause the apparatus to perform a method of any of aspects 22 through 41.

Aspect 46: An apparatus for wireless communications at a central unit, comprising at least one means for performing a method of any of aspects 22 through 41.

Aspect 47: A non-transitory computer-readable medium storing code for wireless communications at a central unit, the code comprising instructions executable by a processor to perform a method of any of aspects 22 through 41.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory)

and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a distributed unit, comprising:
a processor;
memory coupled with the processor; and
instructions stored in the memory and executable by the processor to cause the apparatus to:
receive, from a central unit (CU), a first control signal indicating to release a radio resource control (RRC) connection of a network-controlled repeater mobile termination (NCR-MT), wherein the first control signal comprising an identifier of the NCR-MT;
transmit, to the NCR-MT, a first message indicating a release of the RRC connection;
detect a trigger of new side control information for the NCR-MT; and
transmit a second message, in response to the trigger, indicating to resume the RRC connection of the NCR-MT, wherein the second message comprising the identifier of the NCR-MT.

2. The apparatus of claim 1, wherein the identifier of the NCR-MT comprising one or more F1AP UE identifiers associated with the NCR-MT.

3. The apparatus of claim 1, wherein the instructions to transmit the second message are executable by the processor to cause the apparatus to:
transmit the second message to the CU, wherein the second message comprising a request to initiate a paging of the NCR-MT.

4. The apparatus of claim 3, wherein the identifier comprising one or more F1AP UE identifiers associated with the NCR-MT.

5. The apparatus of claim 1, wherein the instructions to transmit the second message are executable by the processor to cause the apparatus to:
transmit the second message to the CU, wherein the second message comprising a side control configuration for a network-controlled repeater (NCR) associated with the NCR-MT.

6. The apparatus of claim 1, wherein the instructions to transmit the second message are executable by the processor to cause the apparatus to:
transmit the second message to the NCR-MT, wherein the second message comprising a paging message.

7. The apparatus of claim 1, wherein the identifier comprising a paging identity.

8. The apparatus of claim 1, wherein the NCR-MT transitions to an RRC inactive state or an RRC idle state after release of the RRC connection.

9. The apparatus of claim 1, wherein the instructions are further executable by the processor to cause the apparatus to:
transmit, to the CU, a second control signal indicating a request to release the RRC connection of the NCR-MT, wherein the receiving the first control signal is in response to the second control signaling.

10. The apparatus of claim 9, wherein the second control signal comprising an indication of an RRC state of the NCR-MT after release of the RRC connection.

11. The apparatus of claim 9, wherein the second control signal comprising an indication of a network-controlled repeater (NCR) remaining operational after release of the RRC connection, the NCR is associated with the NCR-MT.

12. The apparatus of claim 11, wherein the second control signal comprising a side control configuration for the operation of the NCR after release of the RRC connection.

13. The apparatus of claim 1, wherein the first control signal comprising an indication of an RRC state of the NCR-MT after release of the RRC connection.

14. The apparatus of claim 1, wherein the first control signal comprising an indication of a NCR remaining operational after release of the RRC connection, wherein the NCR is associated with the NCR-MT.

15. The apparatus of claim 14, wherein the indication of the NCR remaining operational includes a side control configuration for operation of the NCR after release of the RRC connection.

16. The apparatus of claim 1, wherein the first control signal comprising an indication to retain a user equipment (UE) context for the NCR-MT.

17. The apparatus of claim 16, wherein the UE context comprising the identifier of the NCR-MT.

18. The apparatus of claim 1, wherein the first control signal comprising a UE context release command message.

19. The apparatus of claim 1, wherein the first control signal comprising a UE context setup message or a UE context modification message or a new message, wherein the first control signal comprising an RRC container to release the RRC connection of the NCR-MT.

20. The apparatus of claim 1, wherein the identifier of the NCR-MT comprising a radio access network (RAN) UE paging identity of the NCR-MT.

21. The apparatus of claim 1, wherein the identifier of the NCR-MT comprising a core network (CN) UE paging identity associated with the NCR-MT.

22. An apparatus for wireless communications at a central unit, comprising:
a processor;
memory coupled with the processor; and instructions stored in the memory and executable by the processor to cause the apparatus to:
  transmit, to a distributed unit (DU), a first control signal indicating to release a radio resource control (RRC) connection of a network-controlled repeater mobile termination (NCR-MT), wherein the first control signal including an identifier of the NCR-MT; and
  receive, from the DU, a second message indicating to resume the RRC connection of the NCR-MT.

23. The apparatus of claim 22, wherein the identifier of the NCR-MT comprising one or more F1AP UE identifiers associated with the NCR-MT.

24. The apparatus of claim 22, wherein the second message comprising a request to initiate a paging of the NCR-MT.

25. The apparatus of claim 24, wherein the identifier comprising one or more F1AP UE identifiers associated with the NCR-MT.

26. The apparatus of claim 22, wherein the second message comprising a side control configuration for a network-controlled repeater (NCR) associated with the NCR-MT.

27. The apparatus of claim 22, wherein the identifier comprising a paging identity.

28. The apparatus of claim 22, wherein the instructions are further executable by the processor to cause the apparatus to:
  receive, from the DU, a second control signal indicating a request to release the RRC connection of the NCR-MT, wherein the transmitting the first control signal is in response to the second control signal.

29. A method for wireless communications at a distributed unit, comprising:
  receiving, from a central unit (CU), a first control signal indicating to release a radio resource control (RRC) connection of a network-controlled repeater mobile termination (NCR-MT), wherein the first control signal comprising an identifier of the NCR-MT;
  transmitting, to the NCR-MT, a first message indicating a release of the RRC connection;
  detecting a trigger of new side control information for the NCR-MT; and
  transmitting a second message, in response to the trigger, indicating to resume the RRC connection of the NCR-MT, wherein the second message comprising the identifier of the NCR-MT.

30. A method for wireless communications at a central unit, comprising:
  transmitting, to a distributed unit (DU), a first control signal indicating to release a radio resource control (RRC) connection of a network-controlled repeater mobile termination (NCR-MT), wherein the first control signal including an identifier of the NCR-MT; and
  receiving, from the DU, a second message indicating to resume the RRC connection of the NCR-MT.

* * * * *